(12) United States Patent
Gougousis et al.

(10) Patent No.: US 8,112,497 B1
(45) Date of Patent: Feb. 7, 2012

(54) ONLINE EDUCATIONAL SOFTWARE

(75) Inventors: Kanella Gougousis, Haberfield (AU);
Michelle McNamara, Redfern (AU);
Seyed Mojtaba Sabbagh-Jafari,
Auburn (AU)

(73) Assignee: Social IT Pty Ltd, Sydney, New South Wales (AU)

( * ) Notice: Subject to any disclaimer, the term of this patent is extended or adjusted under 35 U.S.C. 154(b) by 0 days.

(21) Appl. No.: 13/152,392

(22) Filed: Jun. 3, 2011

(30) Foreign Application Priority Data

Jan. 11, 2011 (AU) ................. 2011900062

(51) Int. Cl.
*G06F 15/16* (2006.01)
(52) U.S. Cl. ........ 709/217; 709/202; 709/203; 709/225; 709/229
(58) Field of Classification Search ................. 709/202, 709/203, 217, 225, 229
See application file for complete search history.

(56) References Cited

U.S. PATENT DOCUMENTS

| | | | |
|---|---|---|---|
| 5,877,757 A | 3/1999 | Baldwin et al. | |
| 5,933,140 A | 8/1999 | Strahorn et al. | |
| 6,289,513 B1 | 9/2001 | Bentwich | |
| 6,683,623 B1 | 1/2004 | Cassano et al. | |
| 6,684,213 B1 * | 1/2004 | Schell et al. | 1/1 |
| 6,898,411 B2 | 5/2005 | Ziv-el et al. | |
| 6,922,814 B2 | 7/2005 | Sirhall | |
| 7,228,329 B2 | 6/2007 | Kaiser | |
| 7,305,426 B2 | 12/2007 | Tjong et al. | |
| 7,543,232 B2 | 6/2009 | Easton, Jr. et al. | |
| 7,596,754 B2 | 9/2009 | Wessling et al. | |
| 7,614,014 B2 * | 11/2009 | Burgin et al. | 715/853 |
| 7,908,565 B2 * | 3/2011 | Katsuranis | 715/781 |
| 2002/0056058 A1 | 5/2002 | Nishio et al. | |
| 2002/0130895 A1 * | 9/2002 | Brandt et al. | 345/708 |
| 2002/0172930 A1 | 11/2002 | Sirhall | |
| 2002/0178212 A1 | 11/2002 | Sirhall | |
| 2005/0071181 A1 | 3/2005 | Christ et al. | |
| 2005/0120129 A1 | 6/2005 | Laukamm et al. | |
| 2005/0233296 A1 | 10/2005 | Ziv-el et al. | |
| 2005/0246638 A1 | 11/2005 | Whitten | |
| 2008/0215976 A1 | 9/2008 | Bierner et al. | |
| 2008/0216023 A1 | 9/2008 | Berglund et al. | |
| 2008/0222295 A1 * | 9/2008 | Robinson et al. | 709/227 |
| 2008/0255988 A1 * | 10/2008 | Maltese | 705/39 |
| 2008/0301558 A1 | 12/2008 | Najafi et al. | |
| 2010/0169363 A1 | 7/2010 | Gaedcke | |

* cited by examiner

*Primary Examiner* — Liangche A Wang
(74) *Attorney, Agent, or Firm* — Sheridan Ross P.C.

(57) ABSTRACT

The invention relates to a method of educating a user about the use of a website. The method includes the step of obtaining interactive web content from the website, and displaying the interactive web content to the user, along with information educating the user about how to interact with the website. The method then further includes receiving user input for a user interaction with the web content. The user interaction is assessed, to determine if it is in accordance with the information presented to the user. If so, the interaction is transmitted to the website. The present invention has particular application to social networking websites, and educating a user about behavioral and ethical issues associated with social networking online.

15 Claims, 3 Drawing Sheets

ONLINE EDUCATIONAL SOFTWARE

FIELD OF THE INVENTION

The present invention relates to the field of online education. In particular, the present invention relates to a software program for educating a user in relation to web functionality, provided over the Internet. For convenience, the present invention will be described with reference to social networking websites. However, the invention has broader application.

BACKGROUND OF THE INVENTION

The Internet, as it is now used, is a highly interactive medium. Internet users can now read and create content or commentary relating to virtually any issue. Social networking websites, in particular, allow users to interact with each other in many ways, and to convey opinions, observations, or updates on their life as they see fit.

Online social networking has taken off in recent years. Websites such as Facebook, Twitter, MySpace, LinkedIn and many others have acquired a large member base, with members located all around the world. These social networking websites allow users to interact with many friends and acquaintances at once, simply using a computer, as well as providing the opportunity to meet new friends (who may share the same interests) or to promote your own activities. They also allow a user to store photographs or videos and share them with friends or other interested parties.

Whilst social networking websites are becoming increasing popular, this popularity is generally dominated by younger generations. Older generations, often seen as less "Internet savvy", often do not see the benefits of online social networking, or are unable to take advantage of these benefits due to difficulties in using the websites.

Another problem for social networking websites is that they raise issues of privacy and security. Users can often upload a large amount of personal information—addresses, phone numbers and personal photographs. Whilst most social networking websites allow users to use privacy settings to restrict access to this personal information (e.g. only to people in the user's "friends list"), if a user does not fully understand how to manage these settings, or understand the risks associated with publishing this information more widely, then this personal information may be published more broadly than the user intended it to be. This can, in some cases, create risks for users of social networking sites. One class of vulnerable people includes young people, who may identify their location in their personal information, and may also post that they are leaving home (or running away from home). Posting this information may put them at risk from online predators.

As many users of social networking sites are children or teenagers, they may be vulnerable to being exploited by older parties using these websites. However, as the majority of older generations are not overly familiar with these websites, there is some difficulty for them in supervising or educating children or teenagers. For example, a parent or teacher may be unable to adequately supervise their children or students, due to a lack of understanding of these sites. Indeed, they may not even properly understand the benefits of these social networking sites, which can make it difficult for them to relate to or influence the younger users.

There are many other issues raised by social networking websites. For example, there are questions as to how social networking websites should be used by organisational leaders to communicate more effectively using social media platforms. There are also social etiquette and ethical issues—for example, should information posted on a social networking website be consulted prior to employing a person, as part of a background check? Should managers monitor the use, by employees, of social networking websites? If so, should inappropriate use of these websites (in the view of the employer) be used as a ground of dismissal from employment? There is, therefore, a need to educate people about these issues, and assist them in developing ethical frameworks for using these websites.

SUMMARY OF THE INVENTION

Accordingly, in a first aspect of the present invention, there is provided a method for educating a user about the use of an independent website, comprising:
  obtaining, via a computer network, interactive web content from the website;
  displaying, to the user, the interactive web content and information to educate the user about how to interact with the web content;
  receiving user input for a user interaction with the interactive web content; and
  assessing the user interaction, prior to transmission of the user interaction to the website, to determine whether it was in accordance with the information displayed to the user.

Depending on the outcome of the assessment, some embodiments of the invention may take further action. In some embodiments, if the user interaction was in accordance with the information displayed to the user (i.e. the user interaction was 'correct'), the user interaction is transmitted to the website. However, if the user interaction was not correct, then the user interaction may simply not be transmitted, or the user may be provided with an opportunity to remedy their error.

The method may further comprise the preceding step of causing the website to create the interactive web content, and the interactive web content may relate to an interaction between a profile of the user on the website, and a further profile of another member of the website. For example, the method may cause a real 'test' interaction with another website user to be created.

The information may be displayed using a variety of mechanisms, including using a video narrator.

The interactive content may be associated with an educational module. If the user interaction is correct, then the educational module is passed, which may allow the user to attempt one or more subsequent educational modules.

In a further aspect of the present invention, there is provided a computer readable medium, encoded with data representing a computer program, for directing a programmable device to perform the method of the first aspect of the present invention.

In a further aspect of the present invention, there is provided a method of educating a user about the use of an independent website, comprising:
  transmitting instructions over a computer network, to a server, instructing the server to perform the method of the first aspect of the present invention; and
  receiving display instructions from the server, the display instructions detailing information and content to display to the user.

In a further aspect of the present invention, there is provided a computing device for educating a user about the use of an independent website, comprising:
  a memory;
  a network interface; and one or more processors connected to the memory, and configured to:
    obtain, via the network interface, interactive web content from the website;
    provide display data, for displaying to the user, the interactive web content, and information educating the user about how to interact with the web content;
    receive user input for a user interaction with the interactive web content; and
    assess the user interaction, prior to transmission of the user interaction to the website, to determine whether it was in accordance with the information displayed to the user.

The computing device may further comprise a display device in communication with the processor, to display the display data to the user.

The computing device may be a mobile device, such as a mobile telephone or a portable Internet-enabled camera.

According to a further aspect of the present invention, there is provided a computer program product, comprising a computer usable medium having a computer readable program code embodied therein, said computer readable program code adapted to be executed to implement the steps of the above method.

According to a further aspect of the present invention, there is provided an apparatus adapted to perform the preceding method. Yet further aspects of the present invention will be revealed throughout this specification.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Terminology

For the purposes of this specification, the term "website" is used in a broad manner to refer to functionality provided by a server, accessible via the Internet. Examples of a "website" in the context of this specification include social networking websites and web functionality accessible via an application on a mobile phone or other Internet-enabled device, The reference to the website being 'independent' means that the method is performed independently of the content provided by the website—that is, the information provided by the present invention is not information accessible via ordinary use of the website, and is not part of the content provided by the website.

For the purposes of this specification, the term "interactive web content" is used to refer to web content which requests a user interaction. One example of interactive web content is a web form requesting a user to provide personal information to a website. Another example is a button which the user is requested to click, in order to alter or update information stored on the website. Web content which merely allows a user to request additional web content (e.g. a hyperlink) is not considered to be "interactive".

BRIEF DESCRIPTION OF THE DRAWINGS

An illustrative embodiment of the present invention will be discussed with reference to the accompanying drawings wherein.

In the following description, like reference characters designate like or corresponding parts throughout the several views of the drawings.

DETAILED DESCRIPTION

Figure 1:
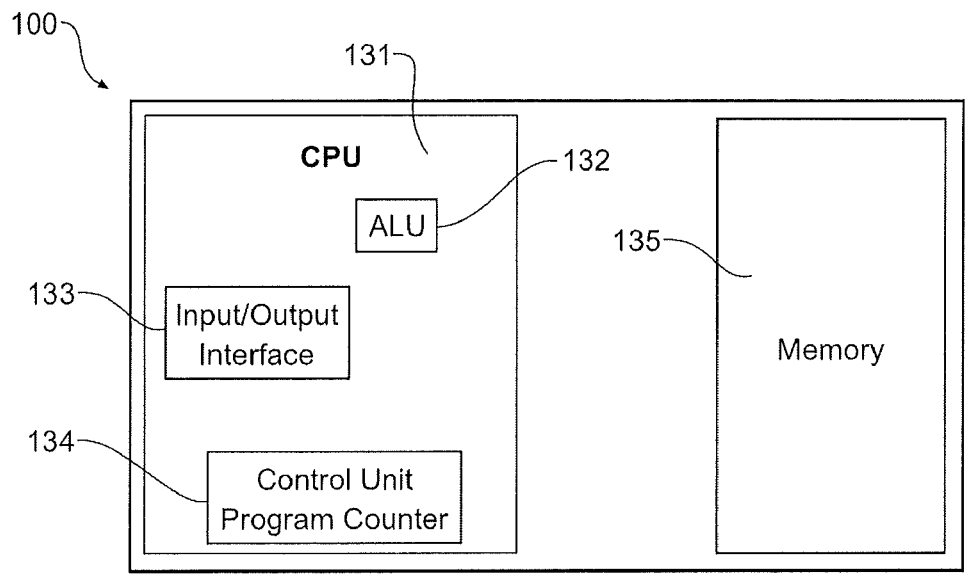
FIG. 1 is a schematic diagram of a computer architecture that may be used to implement the present invention.

Referring firstly to FIG. 1, the present invention is adapted for use with a programmable device such as a personal computer, or a computer server connected to the Internet. FIG. 1 schematically and generally depicts hardware that may be used in the programmable device for implementing the method according to an embodiment of the present invention. A central processing unit (CPU) 131, containing an Input/Output Interface 133, an Arithmetic and Logic Unit (ALU) 132 and a Control Unit and Program Counter element 134 is in communication with input and output devices through the Input/Output Interface 133, and a memory 135. The Input/Output Interface 133 may also comprise a network interface. The present invention can be implemented using a software application for execution on the programmable device.

Figure 2:
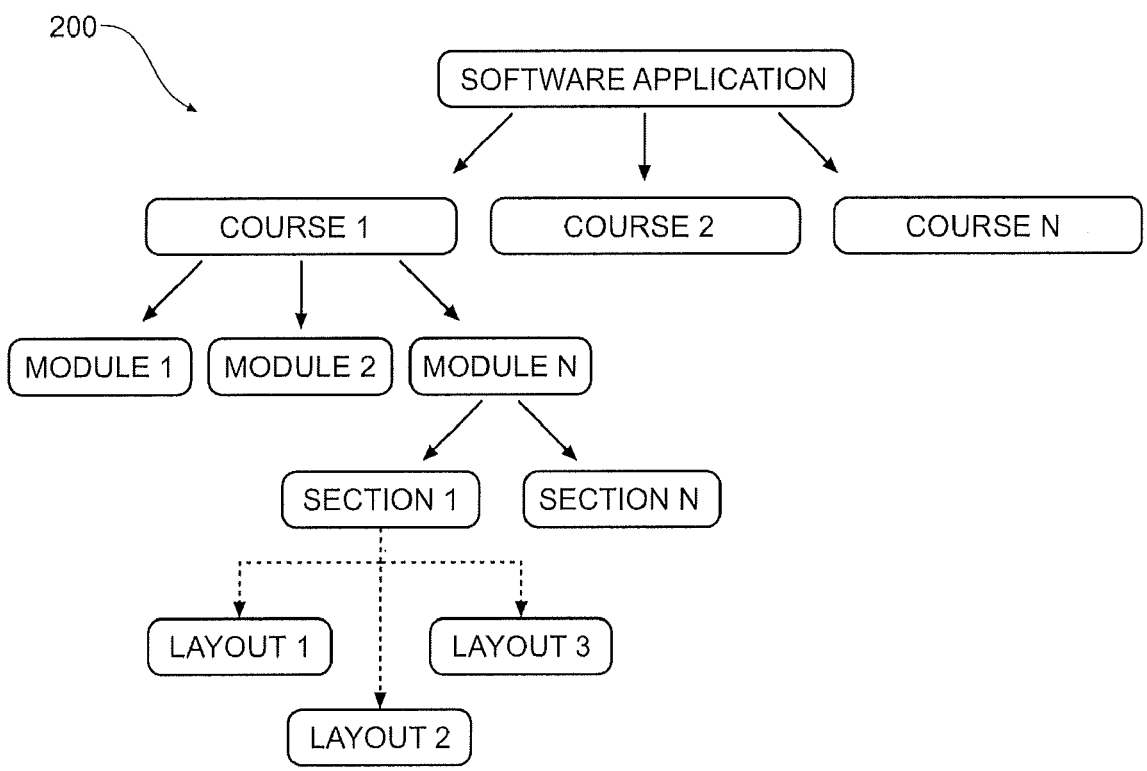
FIG. 2 depicts the modular approach to providing education about one or more websites, adopted by an embodiment of the present invention.

The present invention can be used to educate a user in relation to the use of a variety of websites, and in particular social networking websites such as Facebook, Twitter, etc. As shown in FIG. 2, this embodiment of the present invention takes a modular approach to educating the user, although different embodiments could arrange their education in different manners. Specifically, in this embodiment, the software application provides access to multiple courses, as shown in FIG. 2. The courses may include, for instance, "Introductory Guide to Social Media" or "Social Media and Leadership Decision Making".

As shown in FIG. 2, each course can be made up of a number of 'modules'. For example, a course titled "Introductory Guide to Social Media" may include an exemplary curriculum as follows:
    Module 1: Social Media—What is it?
    Module 2: Facebook How-To
    Module 3: Social Media Usage
    Module 4: Problems and Solutions
    Module 5: Innovation and Trends.

Each module is made up of a number of educational pages or 'sections', as shown in FIG. 2. For example, the "Facebook How-To" module may have a curriculum comprising the following sections:
    Background section
    How to Use sections
    registration
    friend adding
    privacy settings
    creating an event
    etc.

In Depth Look at Privacy section

Etiquette section

Obviously, the above is only intended as an example, and the exact curriculum of a given course and the specific sections within a module could vary widely. Each section, in this embodiment, has a 'layout' associated with it. A section could have a Teaching layout, wherein information is simply presented to the user, a Technology Interaction layout, wherein a user is required to interact with a third party website itself (e.g. Facebook), and the user responses are assessed, or it could have a Quiz layout, wherein a user is simply asked several questions in relation to information that has been presented to them. The types of layouts available may vary widely, and the above examples are provided to simply illustrate some of the potential functions of the different sections within a module.

In this embodiment of the invention, a user can choose their own path to completing the modules within a given course, and so can learn about the use of different features of a website at the time or in the order that they choose. Of course, for some course curriculums, it may be necessary for the user to complete (and pass) one or more pre-requisite modules before they can attempt the next module, but the present invention allows multiple pathways to be taken to completing all of the available modules, and allows the user to complete them in their own time. However, in this embodiment, a user is required to attempt each section within a module in its designated order.

For example, within a module which teaches a user about a specific website, there may be a "Registration Section" associated with a particular website, allowing a user to register with the website and create their own profile. This will typically be the first section within the module that the user is required to complete. However, after that, there may be a number of other sections that they are required to complete in order to complete that particular module. Other sections within a module may be "Friend Adding", "Creating an Event" or "Privacy Settings". After the completion of a module, the user can decide which module to complete next—for example, there may be specific modules directed to "Cyberbullying", "Managing Risk" or "Innovation and Trends".

By providing a segmented approach to education delivery, this allows a user to undertake those courses that they wish to access or self-select modules to create their own course. It also allows a user's progress to be more readily measured—e.g. by measuring the number of modules that they have completed.

Figure 3:
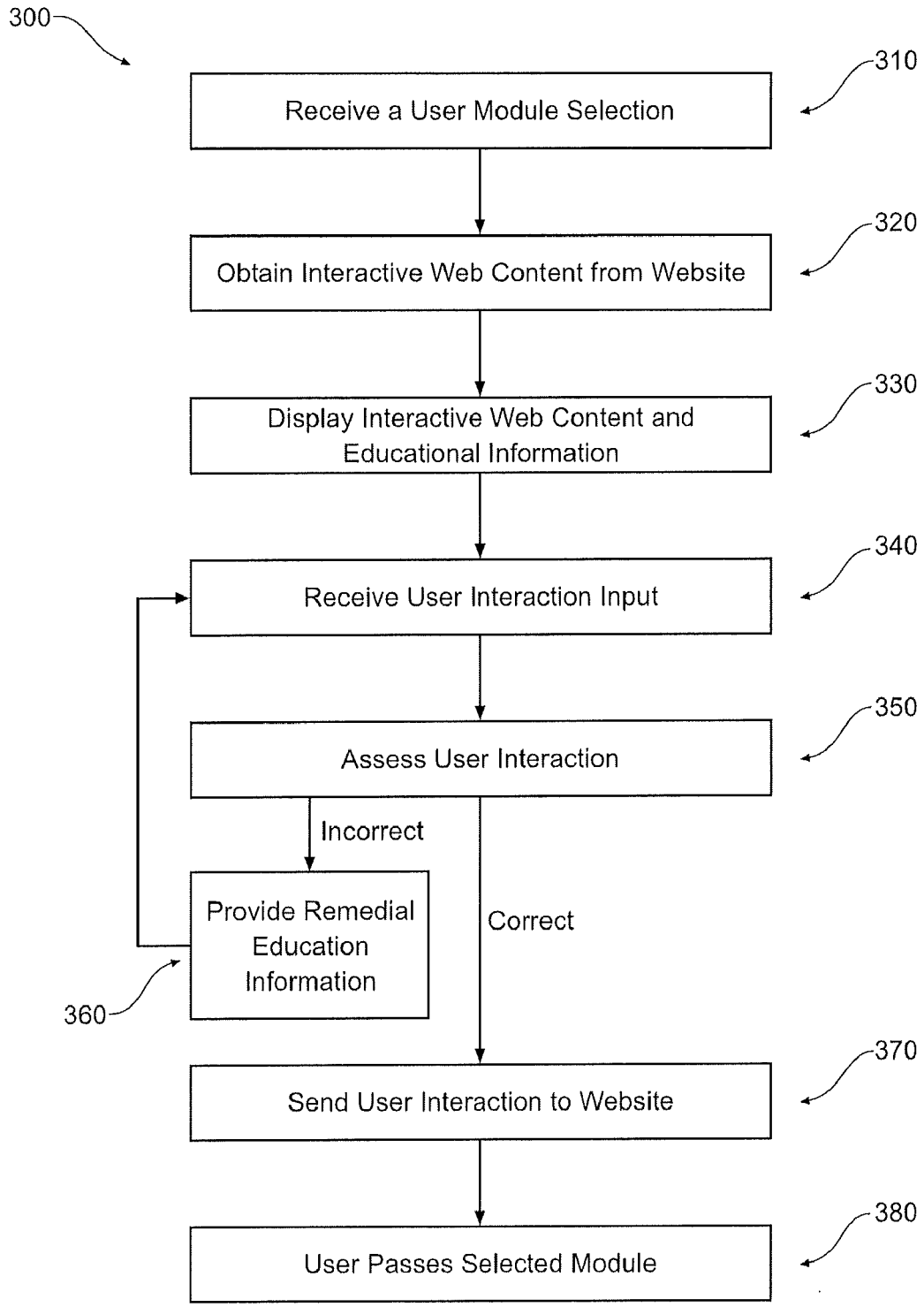
FIG. 3 is a flow diagram depicting the operation of an embodiment of the present invention.

Turning now to FIG. 3, an embodiment of the method 300 of the present invention is shown. Firstly, a user selects which module they wish to attempt—e.g. the "Registration Module" for a particular website (e.g. Facebook). The software application then contacts the website, and obtains interactive web content 320—for example, a web form to be completed by the user to create a profile on the website. The application then displays 330 the interactive web content to the user, as well as education information about the web content.

Figure 4:
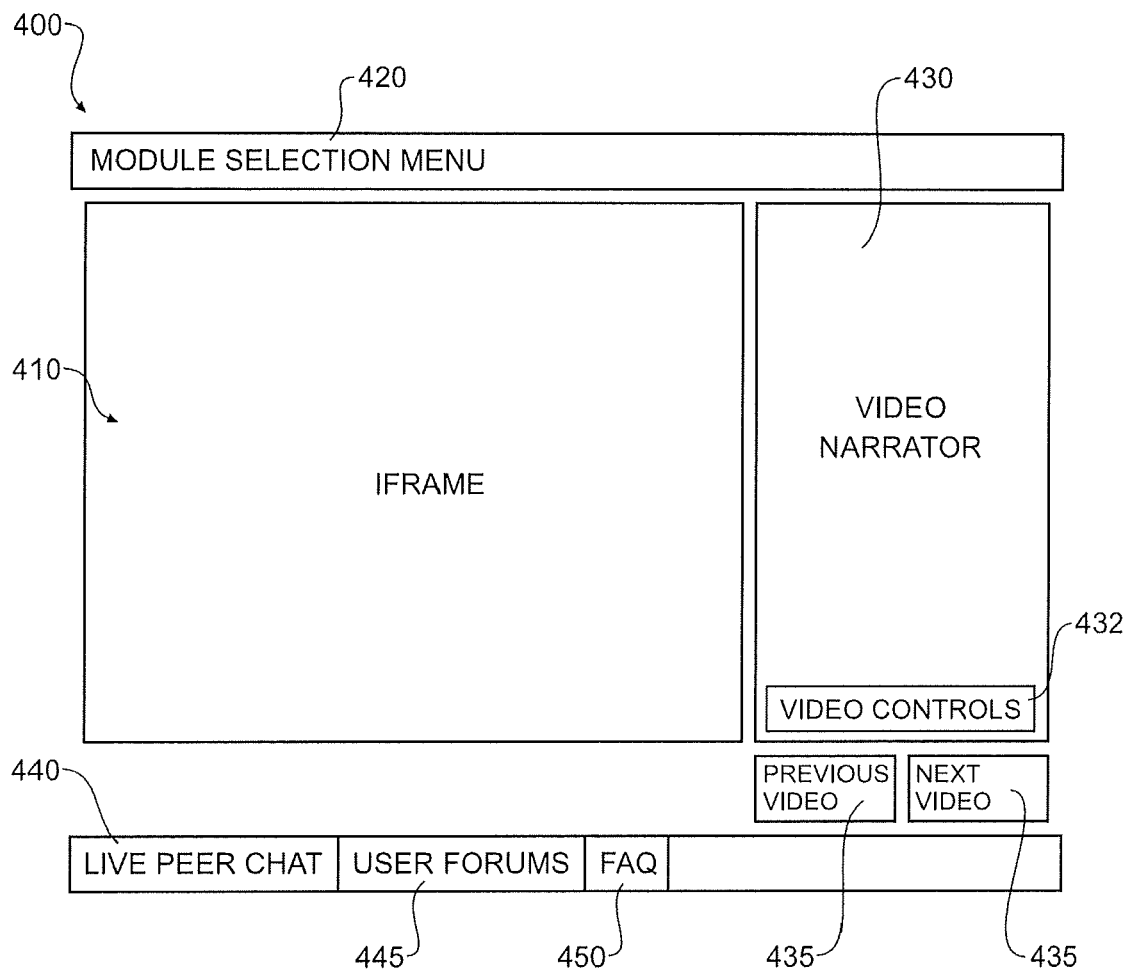
FIG. 4 is a wireframe for a screenshot from an embodiment of the present invention.

FIG. 4 depicts a wireframe for a screenshot 400 from the software application according to this embodiment of the present invention that can be displayed to a user using a conventional display device, such as an LCD display. As shown in FIG. 4, the application uses a frame (or iframe or web browser) 410 to display interactive web content (for example, a Facebook registration page) to a user. At the top of the page is a module selection menu button 420, which enables the user to select a particular educational module to be attempted. The selection of the module is likely to affect the particular page shown in the frame 410. Next to the frame 410, there is shown a video narrator 430, for providing educational information to the user about the page shown in the frame 410. Video controls 432 (e.g. play, stop, pause, etc) are provided at the bottom of the video narrator panel 430. Furthermore, video selection buttons 435 (Next Video, Previous Video) are also displayed. At the bottom of the page, a live peer chat button 440 is shown, enabling a user to immediately chat with other users attempting the same educational course. A user forums button 445 allows a user to access discussion forums associated with the educational course, and a FAQ button 450 links to frequently asked questions about the course. Additional buttons or links may be provided, for example to allow a user to access a help function about the use of the software program provided in this embodiment of the present invention.

The educational information provided by the video narrator 430 may comprise a variety of types of information about the web content. It may simply explain the fundamental purpose of this piece of content (e.g. to create a profile), along with the relevance of different parts of the content (e.g. the narrator may explain the requirements for completing each field, any options the user may have, and any risks associated with providing the information). The educational information, accordingly, may in some cases simply explain the risks associated with the use of the website in certain circumstances—for some users, providing detailed information on their activities may be appropriate, depending on how they wish to use the website. For example, if a user is using a social networking website as a marketing or promotional tool, then it may be appropriate to make more information publicly available to other users of the website. Various different ways of using a website may be appropriate in different circumstances. However, it is desirable that the user is still provided with information outlining any risks or ethical issues that may be associated with using a website in a particular manner.

Of course, the information could be provided using other techniques than a video narrator, within the scope of the present invention. For example, the information could be provided in text form, and in fact this embodiment of the present invention also makes use of the provision of information in text form. Other alternatives include the provision of audio cues, the use of animations, or the provision of a language translator to translate Internet abbreviations (e.g. LOL means "laughing out loud"). Case studies, including video case studies, may also be provided to explain the importance of following the educational information provided and the consequences of failing to follow any recommendations provided (e.g. the creation of a personal security risk or the possibility of creating legal problems for oneself). Nonetheless, the use of a video narrator helps to more readily engage the user and ensure that the information is actually absorbed.

Once the user has received the educational information, they can attempt to interact with the web page, within the frame 410, by providing user input in response to the interactive web content. For example, they may fill out the registration form shown in FIG. 4. Of course, additional information may be presented to the user as they enter each piece of information required for registration—e.g. the video narrator may provide this additional information, or a text popup may appear as the user clicks on the text box for each field on the registration form. The user can then click on the "submit" button, to attempt to finalise their interaction with the registration form.

However, before sending the information to the website, the software application reviews the user interaction, to see whether it is appropriate, and in some cases whether it conforms to the educational information provided. For many web forms, this will simply be a check to ensure that the user has entered appropriate information in each field. However, for more complex web forms or for other content types, the system may check to see whether the user's interaction is ethically appropriate, or whether it compromises security or privacy recommendations provided by the educational information.

If the user interaction is correct, in light of the present invention, the interaction may be sent to the website 370. In this way, real interactions can take place with the website, under the guidance of the application. Furthermore, if the user interaction is deemed correct, then the user can be said to have passed 380 that particular module (or at least a portion of the module).

Of course, for some modules, the application need not actually submit the user interaction to the website. For example, if the module requires the user to create an "Event", to be publicised on a social networking website, then this event may only be a dummy event used for illustrative purposes. Accordingly, whilst the user may wish to know how to create an event, they may not want the dummy event to actually be created on the website.

Therefore, in such cases, the application may never send the final user interaction to the website, or may ask the user, prior to sending, whether they want the event to actually be created.

However, the application will typically handle incorrect user interactions in a different manner. One example, shown in FIG. 3, is to provide remedial educational information 360 to the user. This remedial educational information might explain the user's error(s), and how to correct these errors in future. Furthermore, if the user interaction is incorrect or inappropriate, the user will not pass the module, and accordingly will not be able to attempt more advanced modules. If the user interaction is deemed to be incorrect, in this embodiment it will not be transmitted to the website.

It should be noted that the user interaction may be a valid interaction, permissible by the website, but may still be assessed to be incorrect (not in accordance with the educational information). In this way, the present invention is used to educate, assess and test user behavior in their interactions on the website, including interactions that are viewable by, accessible by, or affect other users of the website, regardless of whether the interaction is permitted by the website.

Users may be graded at different levels (e.g. Beginner, Intermediate, Advanced) depending on the number of modules they have completed, for a particular website. This provides the user with an incentive to complete further modules within the application. It also allows independent tutors, who may be required to provide extra assistance to a user, to quickly and easily determine the amount of knowledge possessed by the user about the website.

In some embodiments of the present invention, the application may cause the interactive web content to be created by the website. For example, if the user begins a "Privacy and Security" module relating to Facebook, the application may itself directly interact with the Facebook website to cause a 'friend request' to be sent to the user from another Facebook profile—e.g. from a profile under the control of the software provider, but not known to the user. This is intended to test whether the user is aware of security and privacy issues associated with receiving 'friend requests' from unknown people—good online security policy is not to accept all 'friend requests'. Accordingly, if the user does not decline the 'friend request' from the other Facebook profile (with whom they are presumably not familiar), then they will fail that particular section of a "Privacy and Security" module.

Another feature of the present invention may be that some modules may prompt the user to take various actions, beyond the simple use of the website. For example, a module on "Work-Life Balance" may require the user to take, and post on the website, photographs of themselves as they walk around a park. It may require the user to do so using a mobile device (e.g. mobile phone and/or camera) they are carrying at the time.

Although the application provides a significant amount of educational information to a user, for educating them about different aspects of a particular website, there may be cases where a user requires additional assistance. Accordingly, they may wish to discuss a particular module or aspect with someone else—a designated tutor, or simply someone else who is undertaking the same course and/or in the same group of users. Accordingly, this embodiment of the present invention provides a live chat feature, which can operate 24 hours, every day, and enables a user to chat with other users or tutors in relation to difficulties that they may be experiencing, or to assist other users who may be experiencing similar difficulties. Of course, other tools may be used to enable users to interact with others—e.g. message boards, forums, group pages, instant messaging, VoIP tools and video conferencing.

This embodiment of the present invention also provides reporting functionality, which allows a user to track their progress. The progress of a particular user may be measured in various ways—for example, the number of modules or courses they have completed, their success in attempting various quizzes in sections within particular modules, or various other evaluation and comparative analysis methods. As the user completes more modules or courses, they may proceed to be a higher accreditation or other recognition of successful completion user (e.g. they may receive a certificate or they may be assigned a ranking or achievement stars). Furthermore, reporting functionality may be provided for higher level users. For example, a principal who has instructed his teachers to complete a course or certain modules may be provided with reports regarding their progress— for example, which modules they have completed or what ranking they have achieved. Similarly, a psychologist or counselor may be provided with reports as to the progress of particular students.

Different tiers of reporting may be provided. At the student tier, an individual student may be able to obtain a selected number and type of reports (e.g. individual progress reports). Users with more privileges may have access to 'team' level reports, and higher level privileges (e.g. 'manager' or 'executive' level reports).

Figure 5:
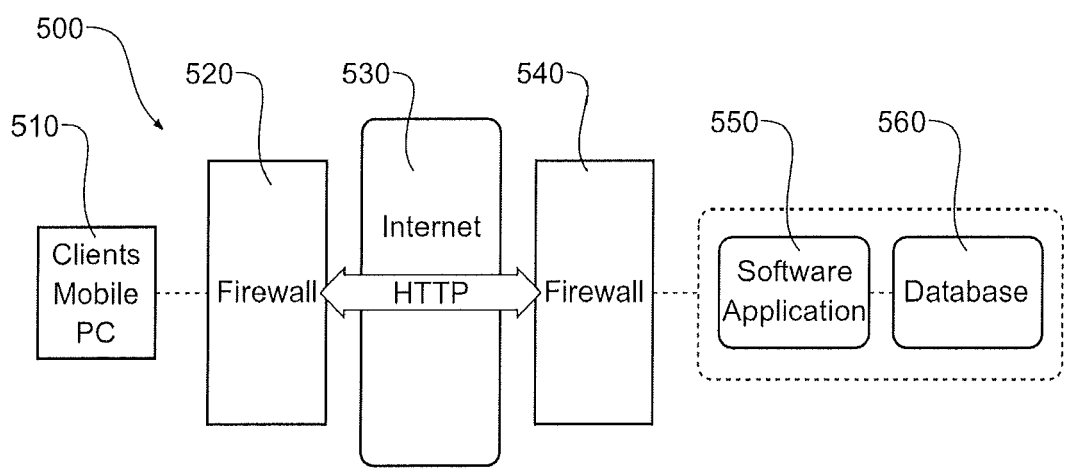
FIG. 5 depicts a client:server architecture that may be used to implement an embodiment of the present invention.

When implementing the present invention, various computer network models may be used. The model utilised by this embodiment of the present invention is to have the application 550 reside and run on a server, which can be accessed by users via the Internet 530, using a client 510 as shown in FIG. 5. The server and client may both use firewalls 520, 540 to provide security for their Internet connections. In this case, the user operates the client 510 to transmit information to the server, instructing the server to run the application, which implements the functionality described above. However, it would clearly be possible to split the functionality between the client and server, or even for all of the functionality to be implemented by a stand-alone software program that is run directly on the user computer.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the claims.

For example, although the present application has been described with particular reference to social networking websites, it could readily be applied to educating users about other types of websites. Furthermore, although the present invention has been described with particular reference to a software programming that can be run on a personal computer or laptop, the present invention can be applied to educate the user about web services offered and accessible via any Internet-enabled devices, such as gaming consoles, cameras, or mobile phones.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

The claims defining the invention are as follows:

1. A method for educating a user about the use of an independent website, comprising:
   obtaining, via a computer network, interactive web content from the website;
   displaying, to the user, the interactive web content and information to educate the user about how to interact with the web content;
   receiving user input for a user interaction with the interactive web content; and
   assessing the user interaction, prior to transmission of the user interaction to the website, to determine whether the user interaction was in accordance with the information displayed to the user; and
   sending the user interaction to the website if the user interaction was in accordance with the information displayed to the user, or not sending the user interaction to the website if the user interaction was not in accordance with the information displayed to the user.

2. The method of claim 1, further comprising the preceding step of causing the website to create the interactive web content, and wherein the interactive web content relates to an interaction between a profile of the user on the website, and a further profile of another member of the website.

3. The method of claim 1, wherein the website is a social networking website, and the information relates to user behavior on the social networking website.

4. The method of claim 1, wherein the information is displayed using a video narrator.

5. The method of claim 1, wherein if the interactive content is associated with an educational module, and if the user interaction is in accordance with the information displayed to the user, the educational module is passed, allowing the user to attempt one or more subsequent educational modules.

6. A non-transitory computer readable medium, encoded with data representing a computer program, for directing a programmable device to perform the method of claim 1.

7. A method of educating a user about the use of an independent website, comprising:
   transmitting instructions over a computer network, to a server, instructing the server to perform the method of claim 1; and
   receiving display instructions from the server, the display instructions detailing information and content to display to the user.

8. A computing device for educating a user about the use of an independent website, comprising:
   a memory;
   a network interface; and
   one or more processors connected to the memory, and configured to:
   obtain, via the network interface, interactive web content from the website;
   provide display data, for displaying to the user, the interactive web content, and information educating the user about how to interact with the web content;
   receive user input for a user interaction with the interactive web content; and
   assess the user interaction, prior to transmission of the user interaction to the website, to determine whether the user interaction was in accordance with the information displayed to the user;

wherein the one or more processors are further adapted to send the user interaction to the website if the user interaction was in accordance with the information displayed to the user;

and wherein the one or more processors are further adapted not to send the user interaction to the website if the user interaction was not in accordance with the information displayed to the user.

9. The computing device of claim 8, wherein the one or more processors are further adapted to cause the website to create the interactive web content, and wherein the interactive web content relates to an interaction between a profile of the user on the website, and a further profile of another member of the website.

10. The computing device of claim 8, wherein the website is a social networking website, and the information relates to user behavior on the social networking website.

11. The computing device of claim 8, wherein the information is displayed using a video narrator.

12. The computing device of claim 8, further comprising a display device in communication with the one or more processors, to display the display data to the user.

13. The computing device of claim 8, wherein the computing device is a mobile device.

14. The method of claim 1, wherein the user interaction is a valid interaction permissible by the website, but is assessed as being not in accordance with the information displayed to the user.

15. The computing device of claim 8, wherein the user interaction is a valid interaction permissible by the website, but is assessed as being not in accordance with the information displayed to the user.

* * * * *